(12) United States Patent
Veine et al.

(10) Patent No.: US 7,562,936 B1
(45) Date of Patent: Jul. 21, 2009

(54) ADJUSTABLE HEAD RESTRAINT ASSEMBLY FOR VEHICLE SEATS

(75) Inventors: Eric Veine, Wixon, MI (US); Mladen Humer, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/201,241

(22) Filed: Aug. 29, 2008

(51) Int. Cl.
*B60N 2/48* (2006.01)
(52) U.S. Cl. ..................................... 297/410
(58) Field of Classification Search ................. 297/410
See application file for complete search history.

(56) References Cited

U.S. PATENT DOCUMENTS

| | | | |
|---|---|---|---|
| 3,563,602 A * | 2/1971 | Ohta et al. ................... | 297/410 |
| 3,572,831 A * | 3/1971 | Barecki et al. ......... | 297/344.21 |
| 4,671,573 A | 6/1987 | Nemoto et al. | |
| 4,779,929 A | 10/1988 | Kuchemann | |
| 5,895,094 A * | 4/1999 | Mori et al. ................... | 297/410 |
| 6,068,337 A * | 5/2000 | De Filippo ................. | 297/391 |
| 7,108,327 B2 | 9/2006 | Locke et al. | |
| 7,137,668 B2 * | 11/2006 | Kreitler ...................... | 297/410 |
| 7,306,287 B2 * | 12/2007 | Linardi et al. ............... | 297/410 |
| 7,316,455 B2 | 1/2008 | Metz et al. | |
| 7,407,231 B2 * | 8/2008 | Kraft et al. ................... | 297/410 |
| 2006/0261661 A1 | 11/2006 | Kraft et al. | |

FOREIGN PATENT DOCUMENTS

| | | |
|---|---|---|
| DE | 19648321 A1 | 6/1997 |
| DE | 19603911 A1 | 8/1997 |
| DE | 19714283 A1 | 11/1997 |
| DE | 19632560 A1 | 2/1998 |
| DE | 10312517 A1 | 10/2004 |
| EP | 0267503 A2 | 5/1988 |
| EP | 0965481 A1 | 12/1999 |
| EP | 0965482 A1 | 12/1999 |
| EP | 0970846 A1 | 1/2000 |
| GB | 2240920 A1 | 8/1991 |
| WO | 03059683 A1 | 7/2003 |

OTHER PUBLICATIONS

Federal Register, Part III, Department of Transportation, National Highway and Traffic Safety Administration, 49 CFR Part 571, Federal Motor Vehicle Safety Standards; Head Restraints; Final Rule, vol. 69, No. 239, Tuesday, Dec. 14, 2004, 45 pages.

* cited by examiner

*Primary Examiner*—Peter R. Brown
(74) *Attorney, Agent, or Firm*—Brooks Kushman P.C.

(57) ABSTRACT

An adjustable head restraint assembly for a vehicle seat is provided with a post for supporting a head restraint for movement along the post. A biasing member is mounted to the head restraint and cooperates with the post for maintaining the head restraint at a locked position. A ramp is fixed to the head restraint within a path of movement of the biasing member. An actuation member is mounted to the head restraint and cooperates with the biasing member for urging the biasing member into engagement with the ramp and consequently out of engagement with the post for permitting movement of the head restraint along the post.

20 Claims, 4 Drawing Sheets

ADJUSTABLE HEAD RESTRAINT ASSEMBLY FOR VEHICLE SEATS

BACKGROUND

1. Field of the Invention

Various embodiments of the present invention relate to adjustable head restraint assemblies for vehicle seats.

2. Background Art

Adjustable head restraint assemblies for vehicle seats are disclosed in the art for adjusting a position of a head restraint assembly relative to the vehicle seat, such as adjustment in a height direction. An example of a head adjustable head restraint assembly for vehicle seats is disclosed in Locke et al. U.S. Pat. No. 7,108,327 B2, which issued on Sep. 19, 2006.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims, and/or as a representative basis for teaching one skilled in the art to variously employ the present invention.

Figure 1:
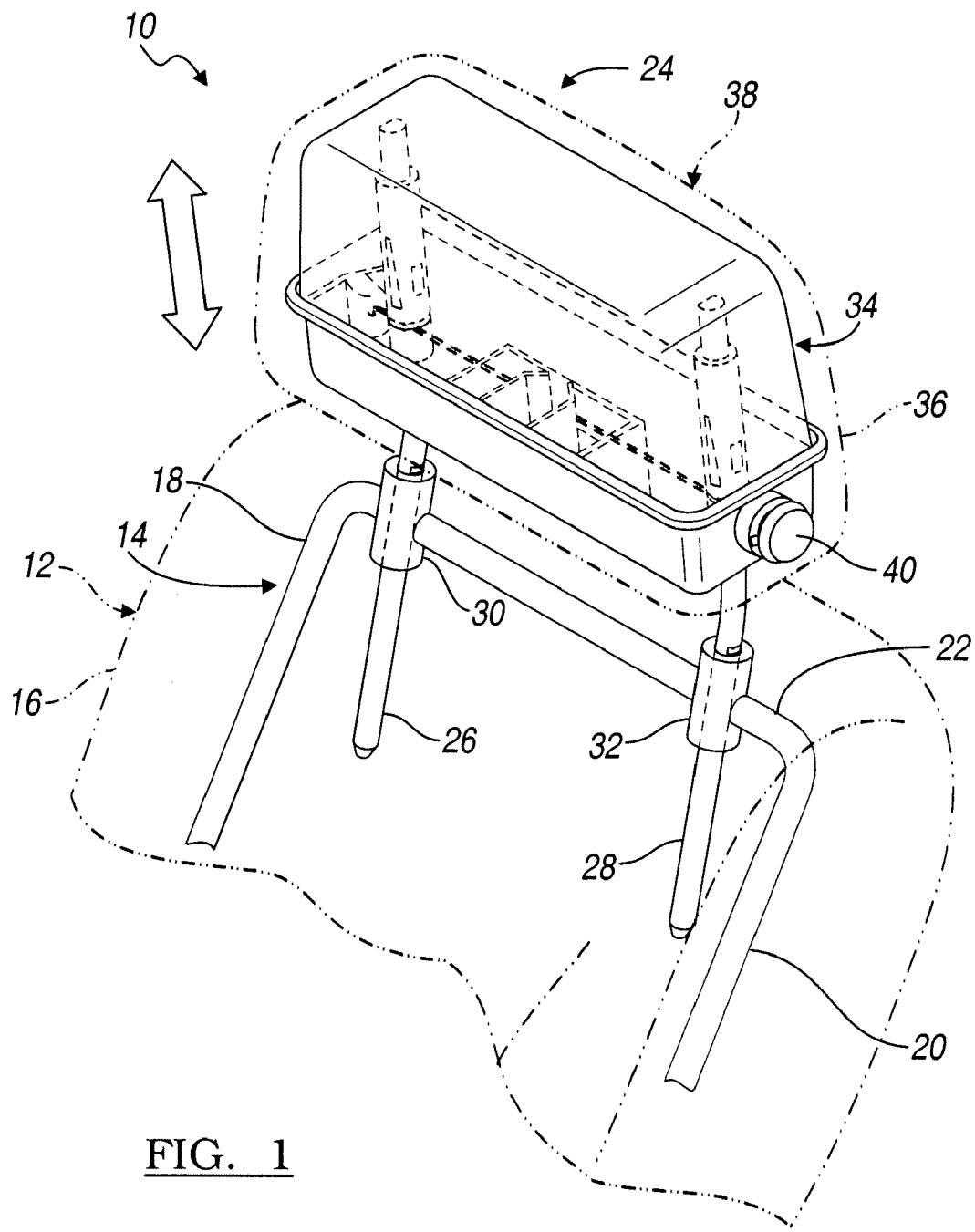
FIG. 1 is a fragmentary perspective view of an adjustable head restraint assembly according to an embodiment, illustrated mounted to a vehicle seat.

With reference now to FIG. 1, a vehicle seat is partially illustrated and referenced generally by numeral 10 for use in a vehicle, such as an automobile, a boat or an aircraft. The seat 10 includes a seat bottom (not shown) that is mounted within the vehicle. The seat 10 also includes a seat back 12 that is mounted to one of the seat bottom or the vehicle. The seat back 12 is illustrated with cushioning and a cover 16 in phantom for revealing a frame 14.

The vehicle seat 10 may be provided anywhere within an associated vehicle, such as a front row seat, an intermediate row seat, a rear row seat, or the like. The seat bottom may be mounted directly to the vehicle floor or coupled to seat adjuster mechanisms or rails extending longitudinally to the vehicle floor and enabling longitudinal, height, and angular adjustment of the seat bottom relative to the vehicle floor. The seat bottom is conventional in design and can be constructed in accordance with any suitable manner, including a structural frame covered by a foam pad layer and other finished cover material.

The frame 14 is formed from any suitable material that is sufficiently light in weight, yet structurally sound for supporting the occupant and for withstanding appropriate testing requirements. The frame 14 includes a pair of side members 18, 20, which are connected by an upper cross member 22. In the description, various embodiments and operating parameters and components of the embodiments are described with directional language such as "left", "right", "above", "below", "upper", "lower", and words of similar import to designate direction shown in the drawings or are understood in the field of the art. Such directional terminology is used for relative description and clarity, and is not intended to limit the orientation of any embodiment, or component of an embodiment to a particular direction or orientation.

The frame members 18, 20, 22 can be formed integrally or from separate components that are joined by any suitable manner, such as welding, stamping, fastening or the like to form the frame 14. The frame 14 is subsequently covered with foam or cushioning and the cover material 16 to support the occupant.

A head restraint assembly 24 is provided in the vehicle proximate to the seat back 12 for supporting a head of the occupant. In the embodiment depicted, the head restraint assembly 24 includes a pair of posts 26, 28 that are secured to the frame 14. The posts 26, 28 may each be received in a corresponding sleeve 30, 32 that is mounted to the upper cross member 22 of the frame 14. The posts 26, 28 may be secured to the sleeve 30, 32, by a suitable fastener such as a retaining ring. Although the posts 26, 28 are illustrated mounted to the frame 14, the invention contemplates that the posts 26, 28 may be secured to any structure of the vehicle body for orienting the head restraint assembly 24 proximate to the seat back 12. For example, the head restraint assembly 24 may be secured to the seat back 12 for various seating arrangements such as front row seating, intermediate seating, and rear row seating. However, in certain seating arrangements the head restraint assembly 24 may be mounted directly to the vehicle body, such as a rear row seating that is adjacent to a cargo compartment, or single row seating vehicles. Although a pair of discrete posts 26, 28 are depicted, the posts 26, 28 may be formed integrally as a continuous rod that includes an intermediate transverse portion connecting upper or lower ends.

The head restraint assembly 24 includes a frame 34 mounted to the posts 26, 28 for adjustment relative to the seat back 12. In the embodiment depicted, the adjustment is provided in an upright direction as illustrated by the linear arrow in FIG. 1, thereby providing a height adjustment of the frame 34 relative to the seat back 12. Alternatively, the adjustment could be utilized in another direction, such as a fore/aft direction within the vehicle by extending the posts 26, 28 in a fore/aft direction. Cushioning or foam padding is provided about the frame 34 with a trim cover 36 enclosing the head restraint assembly 24. The frame 34, padding and cover 36 provide a head restraint 38 that is adjustable relative to the posts 26, 28.

In at least one embodiment, a push button 40 is provided on a lateral side of the frame 34 for cooperating with a locking mechanism for securing the frame 34 and consequently the head restraint 38 to multiple positions along the posts 26, 28. The push button 40 extends external of the trim cover 36 for actuation by the user. Alternatively, the push button 40 may be retained within the trim cover 36, and a designation of the location of the push button 40 may be provided externally on the trim cover 36. As yet another alternative, the posts 26, 28 may be moveable relative to the seat back frame 14, and the locking mechanism may be provided on the seat back frame 14 for adjusting the posts 26, 28 and the head restraint 38 relative to the seat back frame 14.

Figure 2:
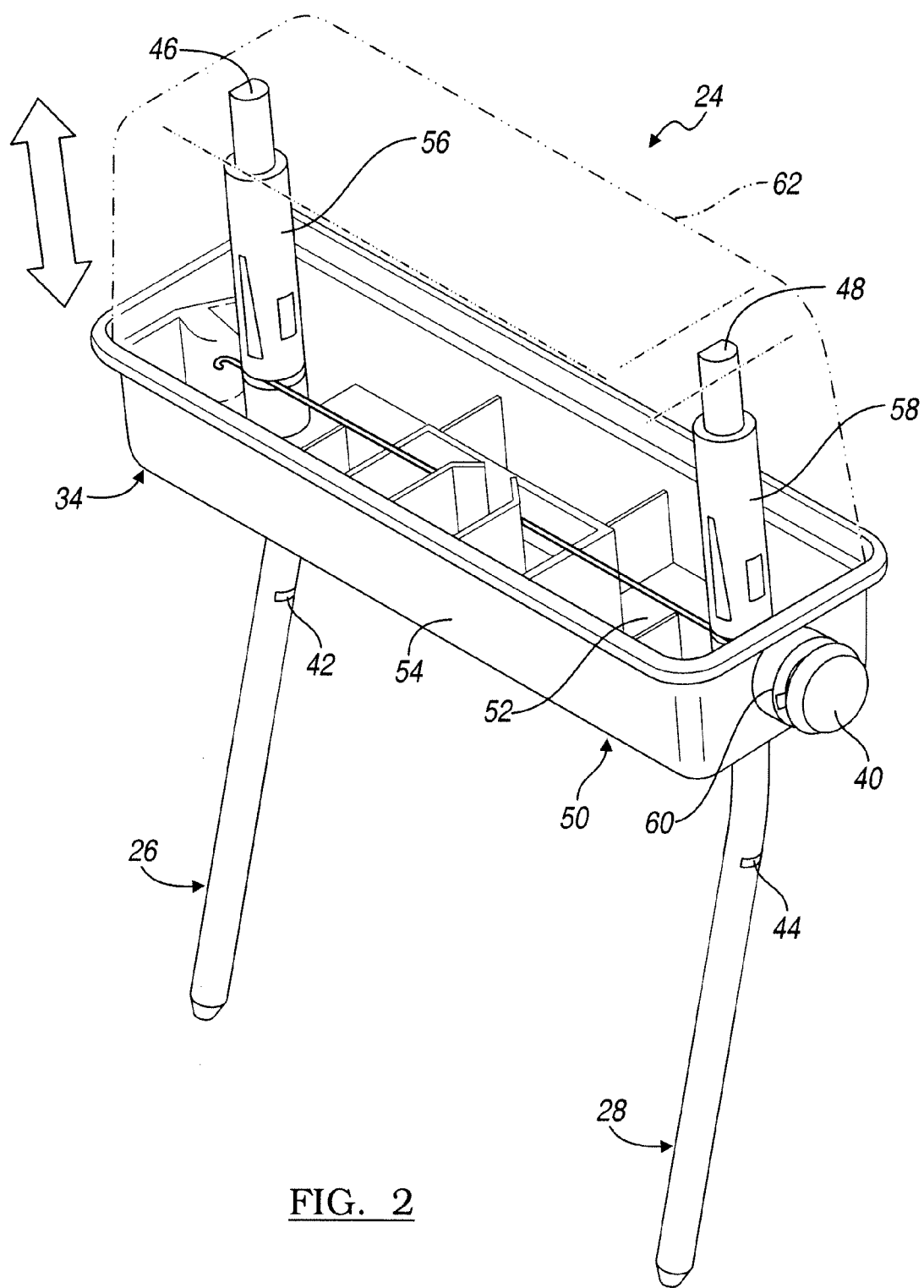
FIG. 2 is an enlarged fragmentary perspective view of the adjustable head restraint assembly of FIG. 1.

Referring now to FIG. 2, the adjustable head restraint assembly 24 is illustrated in greater detail. Each of the posts 26, 28 is illustrated with a notch 42, 44 for cooperating with a fastener, such as a retaining ring for securing the posts 26, 28 to the frame 14. Each of the posts 26, 28 includes a generally upright portion 46, 48. The head restraint frame 34 is mounted to the upright portions 46, 48 of the posts 26, 28 for movement along the upright portions 46, 48 for adjustment of the head restraint 38 relative to the posts 26, 28.

The head restraint frame 34 includes a lower housing portion 50 that provides a base 52 for the frame 34, with a series of sidewalls 54 extending upward from the periphery of the base 52. A pair of sleeves 56, 58 extend from the base 52, each for receiving one of the upright portions 46, 48 of one of the posts 26, 28. The lower housing portion 50 may be formed integrally from a material having adequate structural characteristics, yet being light in weight, such as a high strength polymer, for example acrylonitrile-butadiene-styrene (ABS), which may be formed by injection molding. The lower housing portion 50 also includes a transverse guide 60, which receives the push button 40 and permits translation of the push button relative to the frame 34.

The frame 34 also includes a cover 62 that cooperates with the sidewalls 54 of the lower housing portion 50 for enclosing the upright portions 46, 48 of the posts 26, 28 and the sleeves 56, 58 of the lower housing portion 50. The cover 62 also encloses the locking mechanism therein, which permits the adjustment of the head restraint 38. The cover 62 may also be formed from a high strength polymer such as ABS, and may be injection molded with a series of structural ribs therein for providing added structural support to the frame 34. The cover 62 may be formed as one component as depicted, or alternatively as multiple components, such as a pair of shell halves for mating to enclose the upright portions 46, 48 of the posts 26, 28, while also mating with the lower housing portion 50. Foam padding is subsequently provided about the frame 38 for providing comfort to the occupant. The trim cover 36 is provided about the foam padding for enclosing the padding, and the frame 34.

Figure 3:
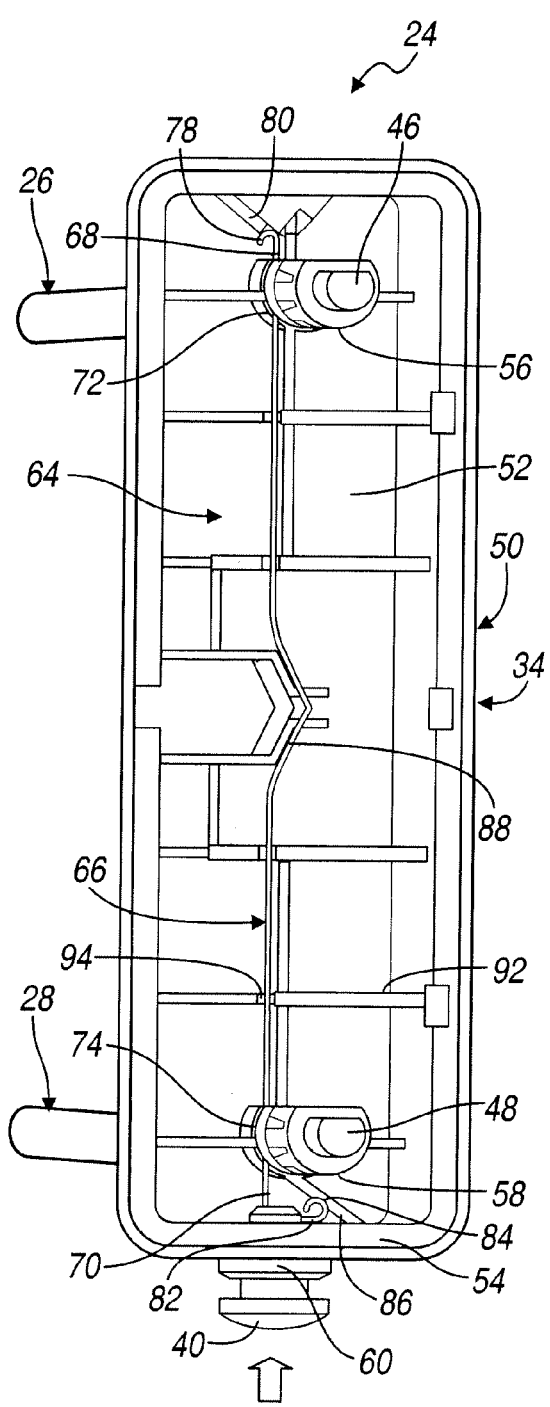
FIG. 3 is a top perspective view of the adjustable head restraint assembly of FIG. 1, illustrated with an upper housing portion removed therefrom, illustrating a locking mechanism.

FIG. 3 illustrates the head restraint assembly 24 with a cover 62 removed thereby revealing a locking mechanism 64 for locking the head restraint 38 to the upright portions 46, 48 of the posts 26, 28. The locking mechanism 64 includes a single spring wire 66 that extends laterally within the cavity of the lower housing portion 50. The spring wire 66 has a first end 68 at one lateral end of the lower housing portion 50, and a second end 70 that extends to the other lateral end of the lower housing portion 50. Each of the sleeves 56,58 includes a recess 72, 74 formed therein for providing access to the corresponding upright portion 46, 48 of the posts 26, 28. In the locked position, the spring wire 66 extends into both recesses 72, 74 thereby engaging the upright portions 46, 48 of the posts 26, 28 and locking the head restraint 38 to an adjusted position upon the upright portions 46, 48 of the posts 26, 28.

Figure 4:
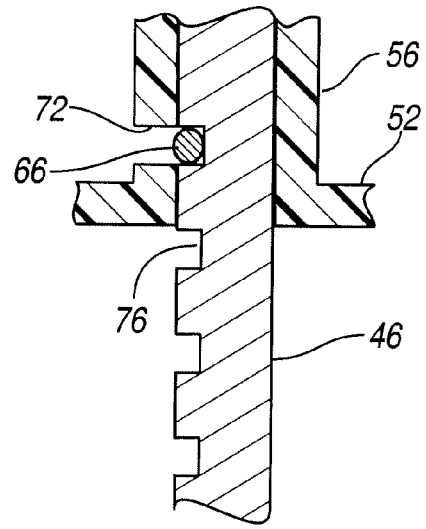
FIG. 4 is a partial section view of a portion of the locking mechanism of FIG. 3.

Referring now to FIG. 4, one of the sleeves 56 is illustrated in partial section for illustrating the recess 72, which permits the spring wire 66 to engage the upright portion 46 of the corresponding post 26. Additionally, each upright portion 46, 48 of the posts 26, 28 may include a series of incremental notches 76 formed therein and aligned with the recess 72 so that the spring wire 66 may extend into the notches 76 at each incremental height position for securely locking the head restraint 38 at the desired position.

Referring again to FIG. 3, the push button 40 is illustrated extending through the sidewall 54 of the lower housing portion 50 and engaging the second end 70 of the spring wire 66. Actuation of the push button 40 by introduction of an external force, consequently actuates the spring wire 66 thereby disengaging the spring wire 66 from the upright portions 46, 48 of the posts 26, 28 for unlocking the head restraint 38 and for adjusting the height of the head restraint 38.

Figure 5:
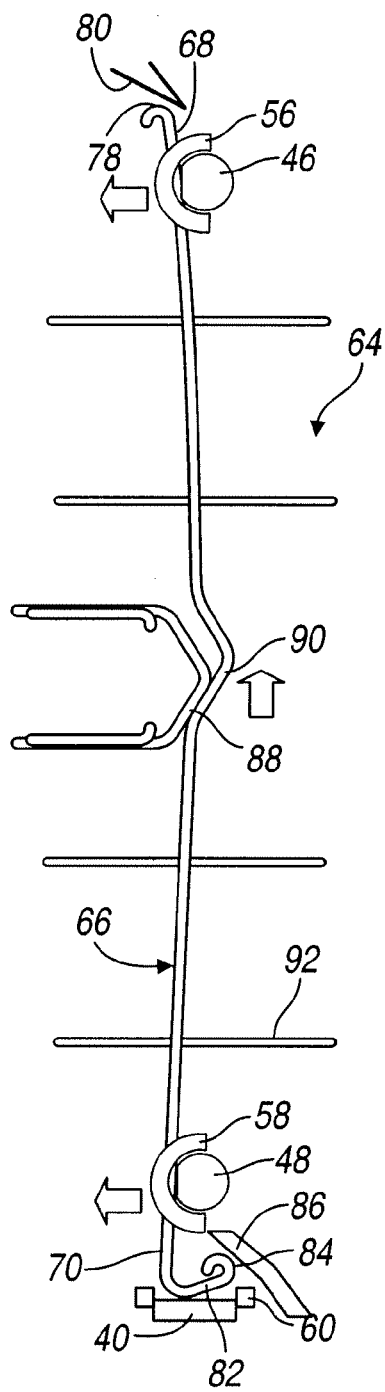
FIG. 5 is a top plan schematic view of the locking mechanism of FIG. 3, illustrated in a locked position.

Referring now to FIGS. 3 and 5, the locking mechanism 64 is illustrated in the locked position. The first end 68 of the spring wire 66 includes a leading surface 78 formed by a curve in the spring wire 66. The lower housing portion 50 includes a first ramp 80 that is oriented within the path of travel of the leading surface 78 of the spring wire first end 68. Upon actuation of the push button 40 and consequently the spring wire 66, the leading surface 78 engages the ramp 80, thereby causing the spring wire 66 to flex as the first end 68 is urged away, and out of engagement with the upright portion 46 of the post 26.

Figure 6:
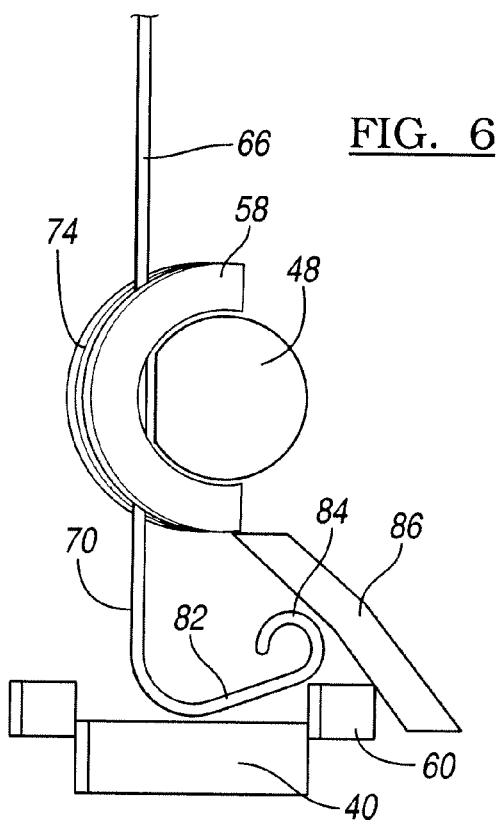
FIG. 6 is an enlarged top perspective schematic view of a portion of the locking mechanism of FIG. 3, illustrated in the locked position.

Referring now to FIGS. 3, 5 and 6, the second end 70 of the spring wire 66 includes a transverse portion 82 that engages the push button 40. Thus, actuation of the push button 40 actuates the transverse portion 82 of the spring wire 66. A leading surface 84 is provided on the transverse portion 82. A second ramp 86 is provided within the lower housing portion 50 within the path of movement of the leading surface 84 of the transverse portion 82. Thus, as the push button 40 and the transverse portion 82 of the spring wire 66 are translated to an unlocked position, the leading surface 84 of the transverse portion 82 engages the second ramp 86 thereby urging the spring wire 66 away from and out of engagement with the upright portion 48 of the post 28.

Figure 7:
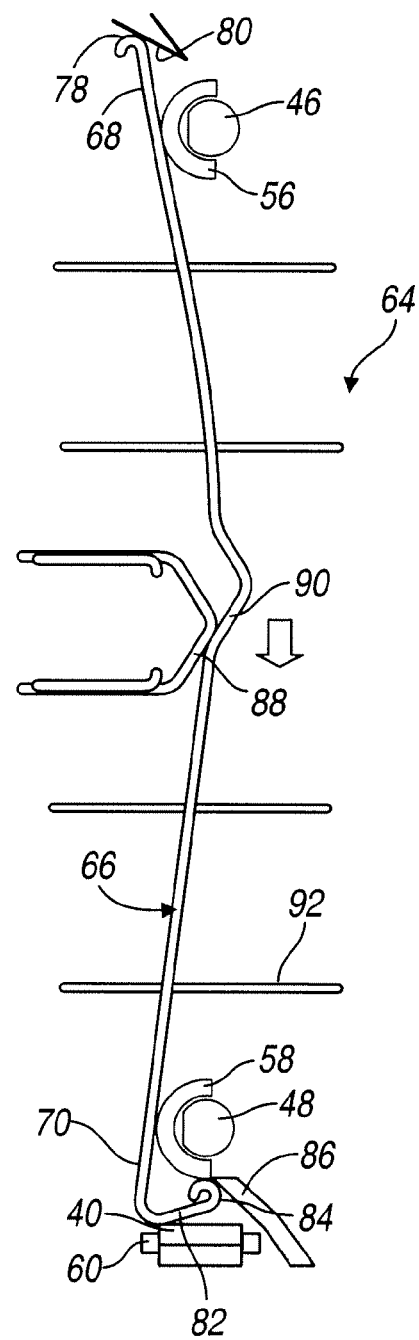
FIG. 7 is another top plan schematic view of the locking mechanism of FIG. 3, illustrated in an unlocked position.

Actuation of the push button 40 in a linear inboard direction as indicated by the arrows in FIGS. 3 and 5 translates the push button 40 from the locked position of FIGS. 3 and 5 to an unlocked position illustrated in FIG. 7. In the unlocked position, the leading surface 78 of the spring wire first end 68 has engaged the first ramp 80 and thereby urges the spring wire 66 out of engagement, and consequently out of a notch 76 of the upright portion 46 of the post 26. Likewise, the leading surface 84 of the transverse portion 82 of the second end 70 of the spring wire 66 has engaged the second ramp 86 thereby urging the spring wire 66 out of engagement with the upright portion 48 of the post 28. In this unlocked position, the spring wire 66 is no longer engaging the upright portions 46, 48 of the posts 26, 28 and therefore the spring wire 66 is disengaged from the corresponding notches 76 thereby permitting the user to adjust the height of the head restraint 38.

Referring now to FIGS. 3, 5 and 7, the lower housing portion 50 is also provided with a third ramp 88 oriented centrally within the lower housing portion 50 between the spaced apart posts 26, 28. The spring wire 66 includes a corresponding leading surface 90 formed in an intermediate region of the spring wire 66. As the spring wire 66 is translated from the locked positions of FIGS. 3 and 5 to the unlocked position of FIG. 7, the intermediate leading surface 90 of the spring wire maintains engagement with the third ramp 88. Since the spring wire 66 has bended in the unlocked position of FIG. 7, the spring wire 66 provides a resultant return force upon the third ramp 88. Upon removal of an external force upon the push button 40, the spring wire 66 expands lengthwise thereby providing the return force against the third ramp 88 for returning the spring wire 66 to the locked position of FIG. 5, and consequently returning the push button 40 to the locked position of FIGS. 3 and 5. As illustrated in FIGS. 3 and 5, the leading surface 90 maintains engagement with the third ramp 88 for maintaining the spring wire 66 in compression in the locked position for maintaining a consistent force against the posts 26, 28 and the push button 40. By maintaining the return force against the push button 40, inadvertent movement between these contacting components is prevented thereby reducing the occurrence of any unwanted sounds such as buzz, squeak and rattle (BSR).

Additionally, the third ramp 88 may act as a fulcrum for the spring wire 66 for providing consistent and predictable movement of the spring ends 68, 70 away from the posts 26, 28 for unlocking, and for returning the spring ends 68, 70 to the posts 26, 28 for locking.

Although the ramps 80, 86, 88 are illustrated as being linear, any suitable geometry is contemplated. For example, the ramps 80, 86, 88 can be provided by cylindrical posts provided within the head restraint assembly 24.

The lower housing portion 50 may include a series of structural ribs 92 for enhancing the structural integrity of the frame 34. The ribs 92 are each illustrated with a recess 94 formed therethrough for permitting the spring wire 66 to extend through the ribs 92. The recesses 94 are oriented outside a path of movement of the spring wire 66. If the spring wire 66 were inadvertently extended outside the prescribed path, the recesses 94 would limit the inadvertent movement and guide the spring wire 66 back into the ordinary path.

The spring wire 66 is illustrated with non-limiting geometries. The invention contemplates utilization with various geometries for providing the locking and unlocking functions. For example, the spring wire 66 could be straight in a free position and preloaded to curve about a head restraint geometry, such as the third ramp 88, into the locked position.

Although the locking mechanism 64 is illustrated in cooperation with the pair of spaced apart posts 26, 28, the invention contemplates cooperation with only one post. An advantage of engaging and locking both posts 26, 28 is that this configuration provides a secured height adjustment position and eliminates any unwanted travel at an unlocked post, which may lead to BSR. Although a pair of ramps 80, 86 are illustrated and described, the invention contemplates utilization of one ramp only 80, 86 for locking with one or both posts 26, 28. Additionally, the invention contemplates utilization of an anti-removal mechanism on one of the pair of posts 26, 28 as is known in the art. The anti-removal mechanism may be employed on a common post with the locking mechanism 64.

By utilizing a single spring wire that extends to the pair of posts 26, 28, the single spring wire 66 is utilized for both locking each of the posts 26, 28 and for providing the return force for maintaining the locked position. Additionally, the spring wire 66 cooperates with both posts 26, 28 for eliminating an actuation plate (or plates) that would otherwise cooperate with the posts 26, 28. Thus, in comparison to the prior art, the single spring wire 66 replaces a pair of, or a single lengthwise, locking plate, and corresponding return springs. The reduction of components reduces costs, weight and the occurrence of BSR.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An vehicle seat with an adjustable head restraint assembly comprising:
    a seat back having a frame;
    at least one post connected to the seat back frame;
    a head restraint connected to the at least one post, wherein one of the head restraint and the seat back frame has a moveable connection with the at least one post for permitting adjustment of the head restraint relative to the vehicle seat;
    a biasing member mounted to the one of the head restraint and the seat back frame for movement relative to the one of the head restraint and the seat back frame, the biasing member cooperating with the at least one post and the one of the head restraint and the seat back frame for maintaining the one of the head restraint and the seat back frame at a locked position along the at least one post;
    a ramp fixed to the one of the head restraint and the seat back frame within a path of movement of the biasing member; and
    an actuation member mounted to the one of the head restraint and the seat back frame for movement relative to the one of the head restraint and the seat back frame, the actuation member cooperating with the biasing member such that movement of the actuation member from a first position to a second position urges the biasing member into engagement with the ramp and consequently out of engagement with the at least one post for permitting movement of the head restraint relative to the seat back frame.

2. The vehicle seat of claim 1 wherein the at least one post further comprises a pair of posts; and
    wherein the head restraint is mounted to the pair of posts for movement along the pair of posts and the biasing member cooperates with the pair of posts for maintaining the head restraint at the locked position.

3. The vehicle seat of claim 2 wherein the head restraint further comprises a frame mounted to the pair of posts;
    wherein the biasing member further comprises a single spring wire mounted to the head restraint frame for cooperating with the frame and the pair of posts for maintaining the head restraint frame in a locked position along each of the pair of posts; and
    wherein the actuation member is mounted to a lateral side of the head restraint frame adjacent to an end of the spring wire for movement relative to the frame, the actuation member cooperates with the spring wire such that movement of the actuation member from the first position to the second position compresses the spring wire thereby disengaging the spring wire from the pair of posts for permitting movement of the head restraint along the pair of posts, and such that the spring wire returns the actuation member to the first position.

4. The vehicle seat of claim 1 wherein the head restraint further comprises a frame mounted to the at least one post;
    wherein the biasing member is mounted to the head restraint frame for cooperating with the head restraint frame and the at least one post for maintaining the head restraint frame in the locked position along each of the pair of posts; and
    wherein the actuation member is mounted to a lateral side of the head restraint frame adjacent to an end of the biasing member for movement relative to the head restraint frame, the actuation member cooperates with the biasing member such that movement of the actuation member from the first position to the second position compresses the biasing member thereby disengaging the biasing member from the at least one post for permitting movement of the head restraint along the at least one post.

5. The vehicle seat of claim 4 further comprising:
    padding oriented about the head restraint frame for providing comfort to an occupant; and
    a trim cover oriented about the padding and the head restraint frame for enclosing the adjustable head restraint assembly.

6. The vehicle seat of claim 1 wherein the biasing member further comprises a spring wire.

7. The vehicle seat of claim 6 wherein the spring wire includes a leading surface for engaging the ramp.

8. The vehicle seat of claim 6 wherein the head restraint further comprises a frame mounted to the at least one post;
    wherein the spring wire is mounted to the head restraint frame for cooperating with the head restraint frame and the at least one post for maintaining the head restraint frame in the locked position along each of the pair of posts; and wherein the actuation member is mounted to a lateral side of the head restraint frame adjacent to a first end of the spring wire for movement relative to the frame.

9. The vehicle seat of claim 8 wherein the ramp is fixed to a lateral end of the head restraint frame spaced apart from the actuation member for engagement with a second end of the spring wire.

10. The vehicle seat of claim 9 wherein the at least one post further comprises a pair of posts;

wherein the head restraint frame is mounted to the pair of posts for movement along the pair of posts and the spring wire cooperates with the pair of posts for maintaining the head restraint frame at the locked position; and wherein the ramp is oriented adjacent to a first of the pair of posts for urging the spring wire away from the first post.

11. The vehicle seat of claim 10 wherein the ramp is further defined as a first ramp; and wherein the adjustable head restraint assembly further comprises a second ramp fixed to the head restraint frame adjacent to a second of the pair of posts and within the path of movement of the spring wire for urging the spring wire away from the second post.

12. The vehicle seat of claim 11 wherein the first end of the spring wire includes a transverse portion that cooperates with the actuation member, and a leading surface for engaging the second ramp.

13. The vehicle seat of claim 11 wherein each of the pair of posts has a series of notches formed incrementally therein, the spring wire engages one of the notches of each of the pair of posts for maintaining the head restraint frame in the locked position along each of the pair of posts, and the first and second ramps urge the spring wire out of engagement of the notches in the unlocked position.

14. The vehicle seat of claim 11 wherein the spring wire has an intermediate region with an angled surface formed therein; and wherein the adjustable head restraint assembly further comprises a third ramp fixed to the head restraint frame within a path of movement of the angled surface of the spring wire intermediate region for urging the spring wire to return to the locked position when an external force is absent from the actuation member.

15. The vehicle seat of claim 14 wherein the third ramp is provided between the first and second ramps to provide a fulcrum for flexing the spring wire ends away from the corresponding posts.

16. The vehicle seat of claim 1 wherein the at least one post is generally upright.

17. The vehicle seat of claim 1 wherein the head restraint is connected for movement along the at least one post for permitting adjustment of the head restraint relative to the vehicle seat;

wherein the biasing member is mounted to the head restraint for movement relative to the head restraint, the biasing member cooperates with the at least one post and the head restraint for maintaining the head restraint at the locked position along the at least one post;

wherein the ramp is fixed to the head restraint within the path of movement of the biasing member; and wherein the actuation member is mounted to the head restraint for movement relative to the head restraint, the actuation member cooperates with the biasing member such that movement of the actuation member from the first position to the second position urges the biasing member into engagement with the ramp and consequently out of engagement with the at least one post for permitting movement of the head restraint relative to the seat back frame.

18. An adjustable head restraint assembly comprising:

a pair of posts adapted to be secured to a vehicle proximate to a vehicle seat;

a head restraint frame mounted to the pair of posts for movement along the posts for permitting adjustment of the head restraint relative to the vehicle seat;

a biasing member mounted to the head restraint frame for movement relative to the frame, the biasing member cooperating with the frame and the pair of posts for maintaining the frame in a locked position along each of the pair of posts; and an actuation member mounted to a lateral side of the head restraint frame adjacent to an end of the biasing member for movement relative to the frame, the actuation member cooperating with the biasing member such that movement of the actuation member from a first position to a second position moves the biasing member along its length, thereby compressing the biasing member, and thereby disengaging the biasing member from the pair of posts for permitting movement of the head restraint along the pair of posts.

19. The adjustable head restraint assembly of claim 18 further comprising a ramp fixed to the head restraint within a path of movement of the biasing member such that movement of the actuation member from the first position to the second position urges the biasing member into engagement with the ramp and consequently out of engagement with the pair of posts for permitting movement of the head restraint along the pair of posts.

20. An adjustable head restraint assembly comprising:

a pair of generally upright posts adapted to be secured to a vehicle proximate to a vehicle seat, each of the pair of posts having a series of notches formed incrementally therein;

a head restraint frame mounted to the pair of posts for movement along the posts for permitting adjustment of the head restraint relative to the vehicle seat;

a single spring wire mounted to the head restraint frame for movement relative to the frame, the spring wire cooperating with the frame and engaging one of the notches of each of the pair of posts for maintaining the frame in a locked position along each of the pair of posts;

an actuation member mounted to a lateral side of the head restraint frame adjacent to an end of the spring wire for movement relative to the frame, the actuation member cooperating with the spring wire such that movement of the actuation member from a first position to a second position compresses the spring wire thereby disengaging the spring wire from the notches of the pair of posts for permitting movement of the head restraint along the pair of posts, and such that the spring wire returns the actuation member to the first position.

* * * * *